United States Patent
Wu et al.

(10) Patent No.: US 11,460,346 B2
(45) Date of Patent: Oct. 4, 2022

(54) PHASE SENSITIVITY CALIBRATION METHOD BASED ON PHASE GENERATED CARRIER TECHNOLOGY

(71) Applicant: Anhui University, Hefei (CN)

(72) Inventors: Xuqiang Wu, Hefei (CN); Benli Yu, Hefei (CN); Jinhui Shi, Hefei (CN); Shenglai Zhen, Hefei (CN); Dong Guang, Hefei (CN)

(73) Assignee: Anhui University, Hefei (CN)

( * ) Notice: Subject to any disclaimer, the term of this patent is extended or adjusted under 35 U.S.C. 154(b) by 0 days.

(21) Appl. No.: 17/410,012

(22) Filed: Aug. 24, 2021

(65) Prior Publication Data

US 2022/0065701 A1 Mar. 3, 2022

(30) Foreign Application Priority Data

Aug. 26, 2020 (CN) .......................... 202010873317.1

(51) Int. Cl.
*G01J 9/02* (2006.01)
*G02F 1/21* (2006.01)

(52) U.S. Cl.
CPC ............... *G01J 9/02* (2013.01); *G02F 1/212* (2021.01); *G01J 2009/0226* (2013.01)

(58) Field of Classification Search
None
See application file for complete search history.

(56) References Cited

U.S. PATENT DOCUMENTS

| | | | | |
|---|---|---|---|---|
| 5,351,123 A * | 9/1994 | Spahlinger | ........... | G01C 19/726 356/464 |
| 5,400,417 A * | 3/1995 | Allie | ............... | G02F 1/0123 385/2 |
| 5,500,739 A * | 3/1996 | Strolle | ................ | H04N 9/8205 386/E9.03 |
| 5,903,350 A * | 5/1999 | Bush | ................. | G01B 9/02083 329/346 |
| 6,556,509 B1 * | 4/2003 | Cekorich | ........... | G01B 9/02079 356/477 |
| 6,594,198 B2 * | 7/2003 | Amaral | .................... | H04R 1/44 367/13 |

* cited by examiner

*Primary Examiner* — Violeta A Prieto
(74) *Attorney, Agent, or Firm* — McDonnell Boehnen Hulbert & Berghoff LLP

(57) ABSTRACT

The present disclosure provides a phase sensitivity calibration method based on a phase generated carrier (PGC) technology, which is characterized in that in the operation process of a PGC algorithm, an additional calibration signal with a phase of known magnitude is applied through a phase modulator. This signal is demodulated through an arctangent algorithm or a differential cross multiplication algorithm, and a demodulated output value corresponding to a unit phase in the algorithm is obtained. The phase of known magnitude can be obtained by converting a carrier modulation depth parameter according to a certain ratio.

7 Claims, 1 Drawing Sheet

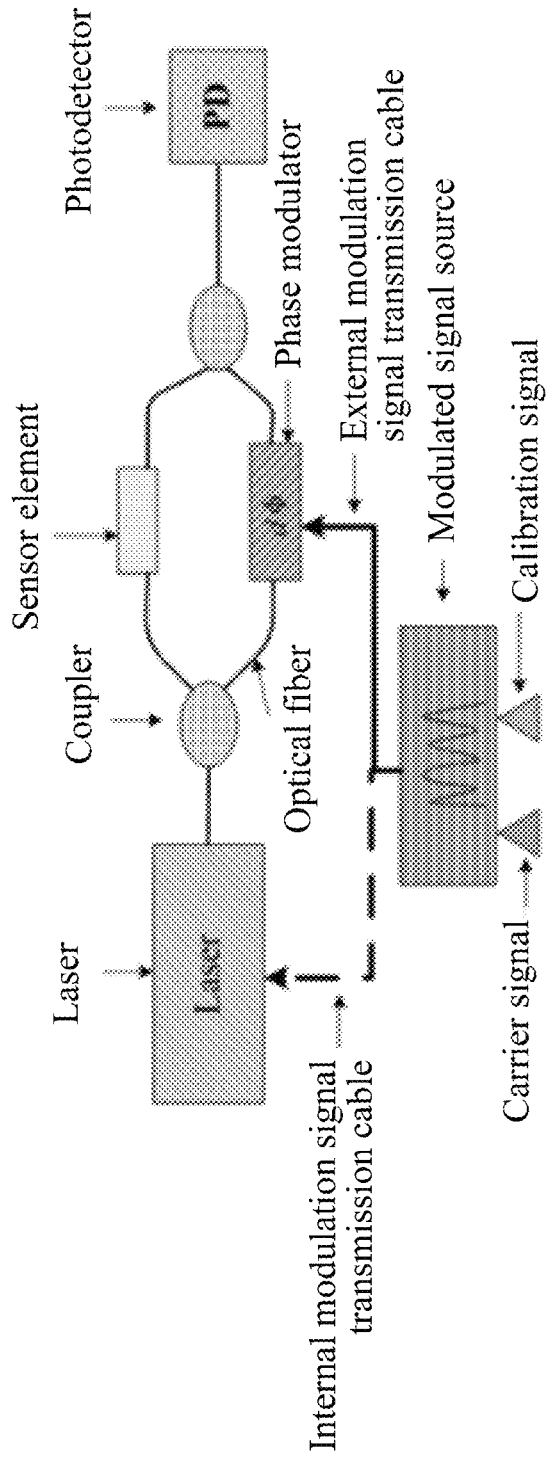

PHASE SENSITIVITY CALIBRATION METHOD BASED ON PHASE GENERATED CARRIER TECHNOLOGY

CROSS REFERENCE TO RELATED APPLICATION

This patent application claims the benefit and priority of Chinese Patent Application No. 202010873317.1 filed on Aug. 26, 2020, the disclosure of which is incorporated by reference herein in its entirety as part of the present application.

FIELD

The present disclosure relates to the field of optical fiber interference sensing and measurement, and in particular to a phase sensitivity calibration method based on a phase generated carrier (PGC) technology.

BACKGROUND

With the rapid advance of scientific research and industrial production, the requirements for high resolution measurements have increased significantly. Optical fiber interferometry has attracted much attention due to the advantages of high sensitivity and anti-electromagnetic interference. The phase generated carrier (PGC) demodulation technology is one of most widely used and stable signal demodulation algorithm for optical fiber interferometry.

In the application of the PGC algorithm, as shown in FIG. 1, the phase of the interferometer changes due to the action of the external measurands stimulating on the sensing area, and the output of the interferometer fluctuates. Based on the fluctuation, the PGC algorithm demodulates and outputs a corresponding demodulated voltage signal to characterize the magnitude and frequency of the external measurands. Several conversions occur during this process. The measurand is converted into a phase, the phase is converted into a demodulated voltage, and the demodulated voltage is converted into the measurand. A standard measurand may be applied through an interferometer, and then a demodulated voltage value is read out so as to establish a relationship between the measurand and the demodulated voltage. The output value of the PGC algorithm is affected by the optical path parameters, the modulation performance of the algorithm and signal output gain. In other words, there is a difference in the phase-voltage conversion when hardware entities, for example, demodulators, of different implementations are used in the same algorithm. Therefore, it is necessary to know the phase-voltage conversion performance of each demodulator, namely the phase sensitivity.

At present, there is no method to directly measure the phase sensitivity of the PGC demodulator. The existing method is an indirect characterization method, that is, the phase sensitivity of the sensor (the relationship between the sensing physical measurand and the phase) and the sensitivity of the sensor after PGC demodulation (the relationship between the sensing physical measurand and the demodulated voltage) are tested by the Bessel function ratio method, so as to establish the relationship between the PGC demodulated phase and the demodulated voltage. This method is complicated, needs to measure many measurands, has many requirements for the equipment and is susceptible to large calculation errors.

SUMMARY

In order to overcome the above shortcomings existing in the prior art, the present disclosure provides an automatic phase sensitivity calibration method based on the PGC technology, which is intended to quickly and conveniently calibrate the phase sensitivity of a phase demodulator.

The object of the present disclosure can be achieved by the following technical solution.

A phase sensitivity calibration method based on a PGC technology includes: first adding an additional calibration signal with a phase of known magnitude through a phase modulator, demodulating the signal through a PGC algorithm, and obtaining the demodulated output value corresponding to a unit phase in the algorithm.

The method specifically includes the following steps:

step 1: obtaining a response relationship between a calibration signal frequency and a carrier frequency based on a performance parameter of the phase modulator of a PGC demodulation sensing system;

step 2: obtaining a corresponding carrier modulation signal amplitude based on a carrier modulation depth C of the PGC demodulation sensing system required by the PGC technology, and obtaining, based on the response relationship obtained in step 1, a signal amplitude U required for the calibration signal to apply a rated phase $\varphi$;

step 3: applying the calibration signal described in step 2 to the phase modulator of the PGC demodulation sensing system, and demodulating a amplitude V of a corresponding signal through the PGC technology; and step 4: comparing the phase $\varphi$ generated by the calibration signal with the signal amplitude V output by the algorithm, and obtaining a demodulated output value corresponding to a unit phase in the algorithm, that is, a phase sensitivity V/$\varphi$ of a demodulator.

As a further solution of the present disclosure, the PGC demodulation sensing system may include a PGC demodulation sensing system based on a Mach-Zehnder interferometer and a PGC demodulation sensing system based on a Michelson interferometer.

As a further solution of the present disclosure, the PGC demodulation sensing system based on a Mach-Zehnder interferometer may include a laser and a modulation signal source; the laser is connected to two couplers through an optical fiber; a sensing element and a phase modulator are connected in parallel between the two couplers; one of the couplers is connected to a photodetector (PD) through an optical fiber; the modulation signal source sends an internal modulation signal to the phase modulator through an internal modulation signal transmission cable to modulate a frequency of the laser; the modulation signal source sends an external modulation signal to the laser through an external modulation signal transmission cable to modulate an optical path of one arm of the interferometer.

As a further solution of the present disclosure, the PGC algorithm can adopt the differential cross multiplication (DCM) algorithm or the arctangent algorithm; when the PGC algorithm adopts the DCM algorithm, C may be 2.37 rad; and when the PGC algorithm adopts the arctangent algorithm, C may be 2.63 rad.

As a further solution of the present disclosure, in step 3, the calibration signal may be loaded through a carrier signal source; the calibration signal may be loaded when needed, and turned off when not needed; the phase modulator may be in the laser or in the interferometer.

As a further solution of the present disclosure, the frequency of the calibration signal may be within a working band set by the sensing system, and the amplitude of the calibration signal may be within a working dynamic range set by the sensing system.

As a further solution of the present disclosure, in step 1, in the response relationship between the calibration signal frequency and the carrier frequency in step 1, the response may refer to that the signal source inputs a certain signal amplitude to the phase modulator and the phase modulator outputs a certain phase accordingly; and the response relationship between the two frequencies may refer to a magnitude relationship of responses for signals with different frequencies under the same signal amplitude.

The beneficial effects of the present disclosure are summarized as follows.

1. The present disclosure is implementable on the basis of an original PGC implementation method without major changes to the original solution, and it is simple to implement and achieves advantageous effects with lower cost.

2. The implementation process of the present disclosure and the phase demodulation process do not need to be in parallel at all times, no external or additional noise is introduced, and the demodulation result cannot be affected.

3. The present disclosure can be applied to various PGC solutions, and has universal applicability.

BRIEF DESCRIPTION OF THE DRAWINGS

The present disclosure is further described in detail below with reference to the accompanying drawings and specific embodiments.

FIG. 1 is a an external structure diagram of a phase generated carrier (PGC) demodulation sensing system based on a Mach-Zehnder interferometer according to the present disclosure.

DETAILED DESCRIPTION

The technical solutions in the embodiments of the present disclosure will be clearly and completely described below. Apparently, the described embodiments are merely some rather than all of the embodiments of the present disclosure. All other embodiments obtained by those of ordinary skill in the art based on the embodiments of the present disclosure without creative efforts should fall within the protection scope of the present disclosure.

The PGC demodulation is often used in a Mach-Zehnder interferometer or a Michelson interferometer. The using methods of the two interferometers are the same, and in this embodiment, the Mach-Zehnder interferometer is described as an example. The PGC demodulation is divided into internal modulation (modulating frequency of a laser) and external modulation (modulating an optical path of one arm of the interferometer) according to the different carrier modes, both of which can achieve the effect of the PGC demodulation. In this embodiment, external modulation will be described.

As shown in FIG. 1, a PGC demodulation sensing system based on the Mach-Zehnder interferometer includes a laser, an interferometer, a sensor element, a phase modulator, a modulation signal source, a PD and a matching demodulation algorithm circuit.

The laser emits laser into the interferometer, and the modulation signal source generates a carrier signal to the phase modulator in the interferometer to modulate the interferometer. An optical signal output by the interferometer is converted into an electrical signal by the PD. The electrical signal is input into the phase demodulator, and its demodulated information is output to characterize external physical measurand information received by the sensor element. As required by the PGC technology, the phase of the carrier signal applied to the interferometer through the phase modulator is C. When the PGC algorithm adpots the DCM algorithm, C is 2.37 rad. When the PGC algorithm adpots the arctangent algorithm, C is 2.63 rad, and the frequency is higher than a maximum frequency of a test band. According to the performance of the phase modulator, a phase modulation response relationship between the frequency of a calibration signal (including frequency and amplitude parameters) and the frequency of a carrier signal is obtained. According to the amplitude of the carrier signal and a phase value of the generated phase C, a signal amplitude U required for the calibration signal to apply a rated phase $\varphi$ is derived. Meanwhile, the modulation signal source transmits the calibration signal to the phase modulator, with an amplitude of U, and the phase demodulator correspondingly outputs a signal, with an amplitude of V, then the phase sensitivity of the demodulator is obtained, that is, $V/\varphi$.

The above contents are merely examples and descriptions of the concept of the present disclosure. Various modifications or supplementations of the specific embodiments described or substitutions in a similar manner made by those skilled in the art without departing from the concept of the present disclosure or going beyond the scope as defined by the appended claims should fall within the protection scope of the present disclosure.

The invention claimed is:

1. A phase sensitivity calibration method based on a phase generated carrier (PGC) technology, comprising: first adding an additional calibration signal with a phase of known magnitude through a phase modulator, demodulating the signal through PGC algorithm, and obtaining a demodulated output value corresponding to a unit phase in the algorithm, wherein the method specifically comprises the following steps:

step 1: obtaining a response relationship between a calibration signal frequency and a carrier frequency based on a performance parameter of the phase modulator of a PGC demodulation sensing system;

step 2: obtaining a corresponding carrier modulation signal amplitude based on a carrier modulation depth C of the PGC demodulation sensing system required by the PGC technology, and obtaining, based on the response relationship obtained in step 1, a signal amplitude U required for the calibration signal to apply a rated phase $\varphi$;

step 3: applying the calibration signal described in step 2 to the phase modulator of the PGC demodulation sensing system, and demodulating a amplitude V of a corresponding signal through the PGC technology; and step 4: comparing the phase $\varphi$ generated by the calibration signal with the signal amplitude V output by the algorithm, and obtaining a demodulated output value corresponding to a unit phase in the algorithm, that is, a phase sensitivity $V/\varphi$ of a demodulator.

2. The phase sensitivity calibration method based on a PGC technology according to claim 1, wherein the PGC demodulation sensing system comprises a PGC demodulation sensing system based on a Mach-Zehnder interferometer and a PGC demodulation sensing system based on a Michelson interferometer.

3. The phase sensitivity calibration method based on a PGC technology according to claim 2, wherein the PGC demodulation sensing system based on a Mach-Zehnder interferometer comprises a laser and a modulation signal source; the laser is connected to two couplers through an optical fiber; a sensor element and a phase modulator are connected in parallel between the two couplers; one of the couplers is connected to a photodetector (PD) through an optical fiber; the modulation signal source sends an internal modulation signal to the phase modulator through an internal modulation signal transmission cable to modulate a frequency of the laser; the modulation signal source sends an external modulation signal to the laser through an external modulation signal transmission cable to modulate an optical path of one arm of the interferometer.

4. The phase sensitivity calibration method based on a PGC technology according to claim 3, wherein the PGC algorithm adpots a differential cross multiplication algorithm or an arctangent algorithm; when the PGC algorithm adpots the differential cross multiplication algorithm, C is 2.37 rad; and when the PGC algorithm adpots the arctangent algorithm, C is 2.63 rad.

5. The phase sensitivity calibration method based on a PGC technology according to claim 1, wherein in step 3, the calibration signal is loaded through a carrier signal source; the calibration signal is loaded when needed, and turned off when not needed; and the phase modulator is in a laser or in an interferometer.

6. The phase sensitivity calibration method based on a PGC technology according to claim 1, wherein the frequency of the calibration signal is within a working band set by the sensing system, and the amplitude of the calibration signal is within a working dynamic range set by the sensing system.

7. The phase sensitivity calibration method based on a PGC technology according to claim 1, wherein in the response relationship between the calibration signal frequency and the carrier frequency in step 1, the response refers to that a signal source inputs a certain amplitude signal to the phase modulator and the phase modulator outputs a certain phase accordingly; and the response relationship between the two frequencies refers to a magnitude relationship of responses for signals with different frequencies under the same signal amplitude.

* * * * *